United States Patent
Ishii (10) Patent No.: US 6,477,119 B2
(45) Date of Patent: Nov. 5, 2002

(54) MAGNETIC HEAD DRIVE CIRCUIT INCLUDING PAIRED AUXILIARY COILS, PAIRED SWITCHING ELEMENTS, AND SWITCH ELEMENT CONTROL CIRCUIT, AND MAGNETO-OPTICAL RECORDING DEVICE USING THE SAME

(75) Inventor: Kazuyoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/736,243

(22) Filed: Dec. 15, 2000

(65) Prior Publication Data

US 2001/0015938 A1 Aug. 23, 2001

(30) Foreign Application Priority Data

Dec. 16, 1999 (JP) ............................................. 11-357635

(51) Int. Cl.[7] .............................................. G11B 11/00
(52) U.S. Cl. ...................................... 369/13.22; 360/46
(58) Field of Search ........................... 369/13.22, 13.23, 369/13.44, 124.14, 13.17, 13.14, 13.02, 13.2; 360/46, 59, 67, 68, 66, 60

(56) References Cited

U.S. PATENT DOCUMENTS

| | | | | |
|---|---|---|---|---|
| 5,351,155 A | * | 9/1994 | Ishii ............................ | 360/46 |
| 5,359,466 A | * | 10/1994 | Fuji et al. ..................... | 360/46 |
| 5,377,055 A | * | 12/1994 | Ishii ............................ | 360/59 |
| 5,377,172 A | * | 12/1994 | Hino et al. ................ | 369/13.22 |
| 5,394,380 A | * | 2/1995 | Hasegawa ................ | 369/13.22 |
| 5,559,763 A | * | 9/1996 | Ishii ........................ | 369/13.22 |
| 5,574,702 A | | 11/1996 | Ishii ........................ | 369/13.22 |
| 5,579,293 A | * | 11/1996 | Ishii ........................ | 369/13.22 |
| 5,586,091 A | * | 12/1996 | Ishii et al. ................ | 369/13.22 |
| 5,587,851 A | * | 12/1996 | Ishii ............................ | 360/59 |
| 5,661,612 A | * | 8/1997 | Hasegawa et al. ............. | 360/59 |
| 5,724,319 A | * | 3/1998 | Fuji et al. ................. | 369/13.22 |
| 5,970,026 A | * | 10/1999 | Wachi et al. ............. | 369/13.22 |
| 5,991,242 A | * | 11/1999 | Ishii ........................ | 369/13.22 |

FOREIGN PATENT DOCUMENTS

JP          63-94406          4/1988

* cited by examiner

Primary Examiner—Ali Neyzari
(74) Attorney, Agent, or Firm—Fitzpatrick, Cella, Harper & Scinto (57) ABSTRACT

To provide a magnetic head drive circuit or a magneto-optical recording device used with the circuit including a pair of auxiliary coils and a magnetic field generating coil for generating a magnetic field by alternately receiving electric currents flowing in opposite directions through the pair of auxiliary coils, and recording an information signal. When the recording of an information signal is stopped, a current for recording an information signal is maintained in a flowing state and gradually reduced, thereby shifting the recording toward a stop state. Thus, the voltage generated in the auxiliary coil by electromagnetic induction when the recording is stopped is reduced, the consumption of electric power is reduced, and the recording speed is improved.

9 Claims, 4 Drawing Sheets

MAGNETIC HEAD DRIVE CIRCUIT INCLUDING PAIRED AUXILIARY COILS, PAIRED SWITCHING ELEMENTS, AND SWITCH ELEMENT CONTROL CIRCUIT, AND MAGNETO-OPTICAL RECORDING DEVICE USING THE SAME

BACKGROUND OF THE INVENTION

1. Field of the Invention

The present invention relates to a magnetic head drive circuit for applying a current for recording an information signal to a magnetic field generating coil provided for a magnetic head. Furthermore, the present invention relates to a magneto-optical recording device for generating a magnetic field whose direction and intensity can be switched according to the information signal on the magnetic head by applying a current to the magnetic field generating coil provided for the magnetic head from the magnetic head drive circuit, applying the magnetic field to a magneto-optical recording medium, and simultaneously emitting an optical beam for recording by an optical head such that the beam can converge at a portion to which the magnetic field is applied, thereby recording the information signal.

2. Related Background Art

Conventionally, a magneto-optical recording device forms a magnetized area having a variable magnetization state on a magneto-optical recording medium. The magneto-optical recording device records an information signal by a magnetic head applying a magnetic field with its direction and intensity switched according to the information signal to a magneto-optical recording medium, and by an optical head emitting an optical beam for recording such that the beam can focus on a potion to which the magnetic field is applied. Patent Application Laid-Open Gazette 63-94406 shows an example of a magnetic head drive circuit, used in the magneto-optical recording device, for applying a current for recording an information signal to a magnetic field generating coil provided for a magnetic head.

Figure 4:
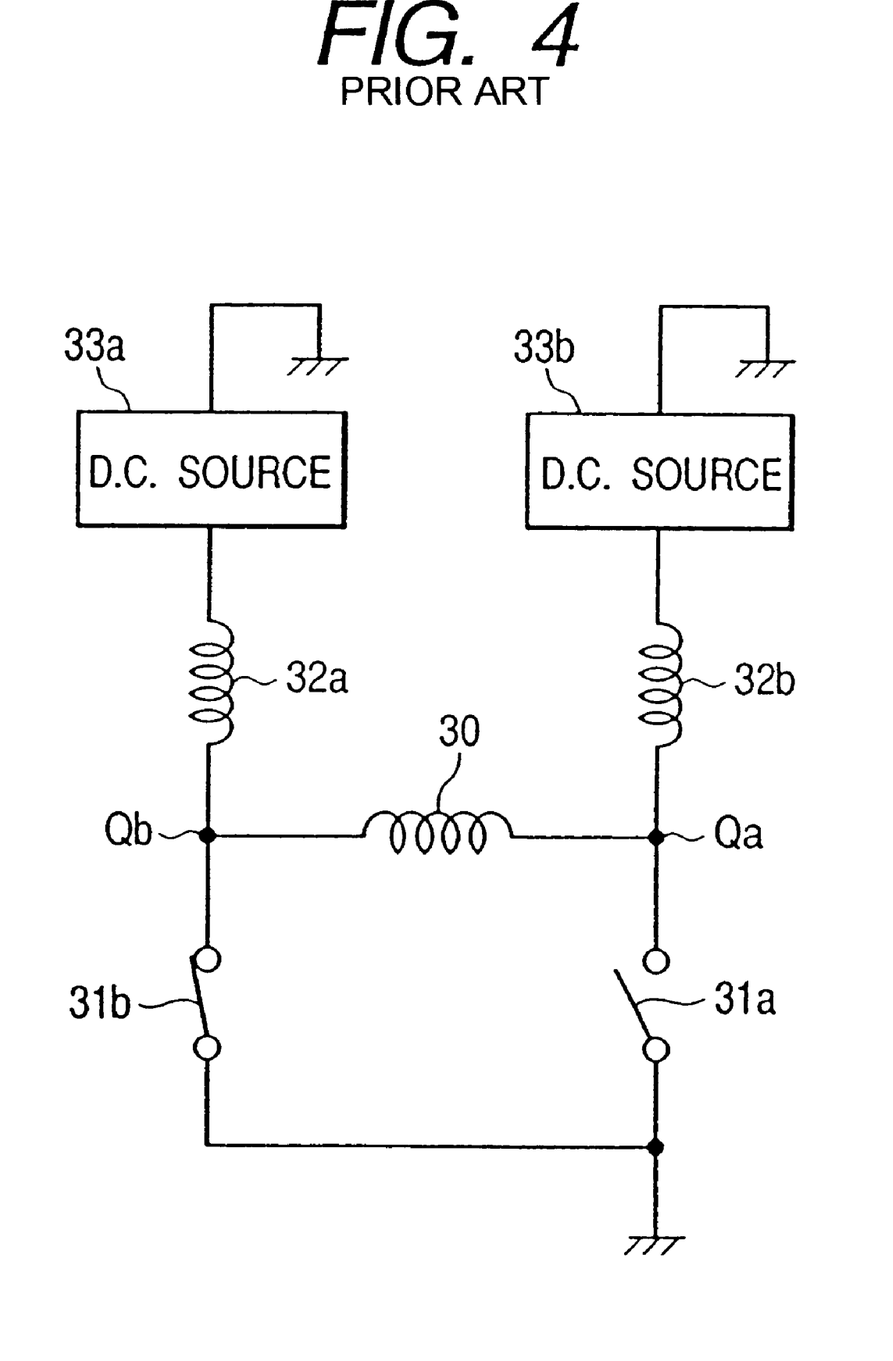
FIG. 4 shows a configuration of the conventional magnetic head drive circuit.

FIG. 4 shows the configuration of the magnetic head drive circuit described in the above mentioned gazette. Reference numeral 30 denotes a magnetic field generating coil provided for the magnetic head. Reference numerals 31a and 31b denote switch elements. Reference numerals 32a and 32b denote auxiliary coils. Reference numerals 33a and 33b denote direct current sources. When an information signal is recorded, the switch elements 31a and 31b are alternately turned on and off according to the information signal. When the switch element 31a is ON and the switch element 31b is OFF, an electric current is applied to the magnetic field generating coil 30 and the switch element 31a from the direct current source 33a through the auxiliary coil 32a. Simultaneously, the current is applied from the direct current source 33b to the switch element 31a through the auxiliary coil 32b.

Alternatively, when the switch element 31a is OFF and the switch element 31b is ON, an electric current is applied to the magnetic field generating coil 30 and the switch element 31b from the direct current source 33b through the auxiliary coil 32b. Simultaneously, the current is applied from the direct current source 33a to the switch element 31b through the auxiliary coil 32a. The inductance of the auxiliary coils 32a and 32b is larger than that of the magnetic field generating coil 30, and a current Ia of the auxiliary coil 32a and a current Ib of the auxiliary coil 32b can be maintained at a substantially constant value Is during the process of recording an information signal regardless of the status of the switch elements 31a and 31b. For example, the current Is is about 0.15A. However, the current Ib of the auxiliary coil 32b decreases by approximately $\Delta I$ when the switch element 31a is switched from ON to OFF, and the current Ia of the auxiliary coil 32a decreases by approximately $\Delta I$ when the switch element 31b is switched from ON to OFF. The reduction $\Delta I$ of the electric current is small as compared with Is.

Thus, by alternately switching ON and OFF the switch elements 31a and 31b, an electric current through the auxiliary coil 32a and an electric current through the auxiliary coil 32b are alternately applied to the magnetic field generating coil 30. The direction of the current applied to the magnetic field generating coil 30 is alternately switched according to an information signal, and a current with the amplitude of approximately ±Is is applied. In addition, a voltage VQa at a connection point Qa between the auxiliary coil 32b and the switch element 31a, and a voltage VQb at a connection point Qb between the auxiliary coil 32a and the switch element 31b change like a pulse with the reduction of the current of the auxiliary coils 32a and 32b by approximately $\Delta I$ due to the electromagnetic induction. When the maximum change speed is 0.015A/ns and the current Ih of the magnetic field generating coil 30 is switched, the peak value Vp1 of the pulse-like voltage is about 15 V.

In the magnetic head drive circuit described in the above mentioned gazette, because it is not necessary for a magnetic head to generate a magnetic field when an information signal is not recorded, it is desired that the consumption of power be reduced by suppressing a current supply from the direct current sources 33a and 33b. To do this, it is necessary to set both switch elements 31a and 31b in the OFF state when an information signal is not recorded.

However, if an information signal is not recorded and both switch elements 31a and 31b are set OFF, then the current Ia of the auxiliary coil 32a and the current Ib of the auxiliary coil 32b are reduced from Is to 0. Conventionally, the operations have not been carefully considered when both elements 31a and 31b are set OFF, and the speed of the reduction of the current Ia and the current Ib is nearly equal to the speed of the change when the current Ih of the magnetic field generating coil 30 is switched during the process of recording an information signal. The voltage VQa at the connection point Qa and the voltage VQb at the connection point Qb temporarily increase with the reduction of the current Ia of the auxiliary coil 32a and the current Ib of the auxiliary coil 32b due to the electromagnetic induction.

Assuming that the inductance of the auxiliary coils 32a and 32b are L, and the change speed of a current is dIx/dt (where Ix is the current Ia of the auxiliary coil 32a or the current Ib of the auxiliary coil 32b), the voltages VQa and VQb substantially match $-L \cdot dIx/dt$. For example, assuming that L is 50 $\mu$H, and |dIx/dt| is 0.015 A/ns at maximum, the peak value Vp2 of the voltage VQa and the voltage VQb is about 750 V. Since the voltages VQa and VQb are applied to the switch elements 31a and 31b in the OFF state, it is necessary to set the resistible voltage Vt higher than the peak value Vp2 of the voltages VQa and VQb (for example, at 800 V) to prevent the destruction of the switch elements 31a and 31b.

At this time, for example, assuming that a MOS FET (MOS type electric field effect transistor) is used as a switch element, the ON resistance (between a drain and a source in the ON state) normally increases with a higher resistible voltage between the drain and the source. Therefore, in the above mentioned magnetic head drive circuit, the ON resistance cannot be reduced because of the restriction of the lower limit of the resistible voltage Vt of the switch element. That problem causes power consumption to increase. In addition, to raise the frequency of an information signal to be recorded, it is necessary to switch the current Ih of the magnetic field generating coil 30 at a higher speed. However, at this time, the speed of reducing the current Ia of the auxiliary coil 32a or the current Ib of the auxiliary coil 32b is also reduced when the recording process is stopped, and the peak value Vp2 of the voltages VQa and VQb rises. Therefore, a higher switch element has to be used for the resistible voltage Vt. However, since the resistible voltage Vt of a practical MOS FET is about 1,00 V at most, there has been the problem that the frequency of an information signal cannot be raised at a higher recording speed.

In addition, assuming that a bipolar transistor is used as a switch element, the gain band width product $f_T$ is normally lowered as the resistible voltage between a collector and an emitter becomes high. Therefore, in the magnetic head drive circuit, the gain band width product $f_T$ cannot be raised by the restriction of the lower limit of the resistible voltage Vt of the switch element. That causes the problem that the frequency of an information signal to be recorded cannot be raised at a higher recording speed.

SUMMARY OF THE INVENTION

The present invention has been developed to solve the problems of the above mentioned conventional technology, and aims at providing a magnetic head drive circuit and a magneto-optical recording device capable of reducing the voltage of an auxiliary coil generated by the electromagnetic induction when the process of recording an information signal is stopped, reducing the consumption of electric power, and raising the recording speed.

The above mentioned objects of the present invention can be attained by the following configuration.

A magnetic head drive circuit for applying an electric current to a magnetic field generating coil of a magnetic head for recording an information signal includes:

a pair of auxiliary coils;

a pair of switch elements connected in series to the pair of auxiliary coils; and a switch element control circuit for controlling the switch elements, wherein the magnetic field generating coil is provided between the connection points of the pair of auxiliary coils and the pair of the switch elements, the switch element control circuit switches the direction of the drive current flowing through the magnetic field generating coil by alternately setting ON the pair of the switch elements according to an information signal during the recording of an information signal, and holds the switch element in the ON state when the recording of the information signal is stopped, and then switches the switch element from the ON state to the OFF state slower than in the recording of the information signal.

The object of the present invention can also be attained by the following configuration.

A magneto-optical recording device includes:

the above mentioned magnetic head drive circuit, and an optical head, wherein a magnetic field generated according to an information signal to be recorded is applied from the magnetic field generating coil to a magneto-optical recording medium, and the optical head emits an optical beam to a portion to which the magnetic field is applied, thereby recording an information signal to the magneto-optical recording medium.

This is described later in detail.

DETAILED DESCRIPTION OF THE PREFERRED EMBODIMENT

Figure 1:
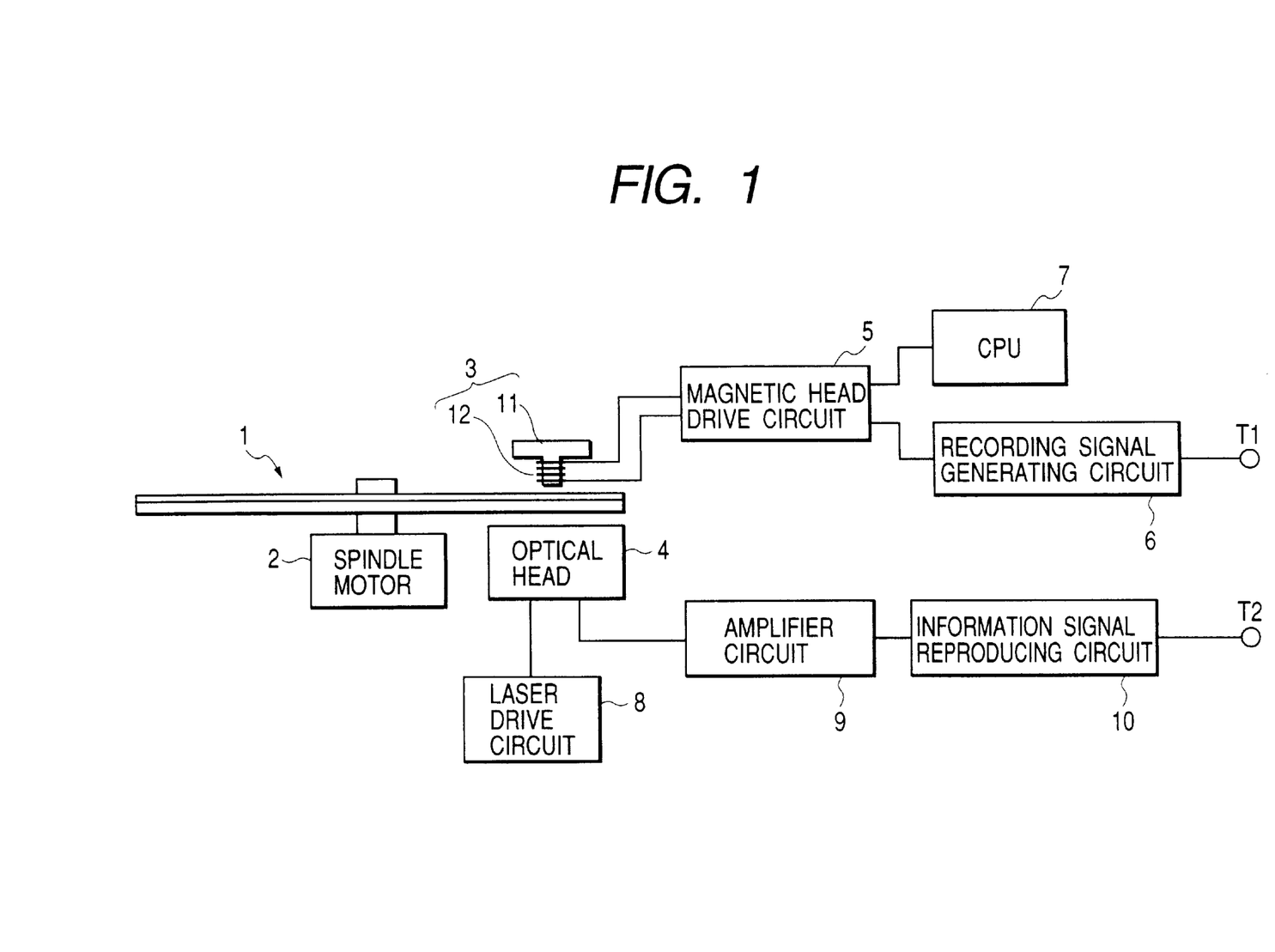
FIG. 1 shows an embodiment of a magneto-optical recording device according to the present invention.

An embodiment of the present invention will be described below in detail by referring to the attached drawings. FIG. 1 is a block diagram showing a configuration of an embodiment of the magneto-optical recording device according to the present invention. Reference numeral 1 denotes a magneto-optical disk mounted in a spindle motor 2 as a magneto-optical recording medium on which an information signal is recorded. A magnetic head 3 is mounted on the surface of the magneto-optical disk 1, and an optical head 4 is mounted, opposite the magnetic head 3, on the reverse surface of the magneto-optical disk 1. The magnetic head 3 comprises a core 11 made of a weak magnetic material, and a magnetic field generating coil 12 around the core 11. A magnetic head drive circuit 5 is connected to the magne3tic field generating coil 12 of the magnetic head 3, and a recording signal generating circuit 6 and a CPU (central processing unit) 7 are connected to the magnetic head drive circuit 5.

The optical head 4 comprises a laser beam source, an optical sensor, an optical system, etc. A laser drive circuit 8 is connected to the laser beam source, and an amplifier circuit 9 and an information signal reproducing circuit 10 are connected to the optical sensor. When an information signal is recorded on the magneto-optical disk 1, the spindle motor 2 first rotates the magneto-optical disk 1. Then, the recording signal generating circuit 6 performs processes of encoding the information signal input from an input terminal T1, etc. and transmits it to the magnetic head drive circuit 5. The magnetic head drive circuit 5 provides a current whose direction and intensity can be switched according to the information signal for the magnetic field generating coil 12 of the magnetic head 3. Thus, the magnetic head 3 generates a magnetic field whose direction and intensity can be switched according to the information signal, and applies it vertically to the magneto-optical disk 1.

In addition, the laser drive circuit 8 applies a current for the laser beam source of the optical head 4 simultaneously when the magnetic head 3 applies the magnetic field, and generates a laser beam which is an optical beam for recording. The optical beam for recording is modulated into a pulse-like format, or maintained for substantially constant intensity. Furthermore, the optical system emits the optical beams for recording such that the beams can focus into a small optical spot in an application area of the magnetic field of the magneto-optical disk 1. As a result, on the magneto-optical disk 1, a magnetized area whose magnetization direction and intensity change depending on the direction and intensity of the applied magnetic field is formed, and an information signal is recorded.

When the recorded information signal is reproduced, the spindle motor 2 rotates the magneto-optical disk 1, and the optical head 4 emits a laser beam which is an optical beam for reproduction having power lower than the optical beam for recording such that it can focus to a small optical spot on the magneto-optical disk 1. Since the deflection surface of a reflected light of the optical beam for reproduction from the magneto-optical disk 1 rotates depending on the direction and intensity of the magnetization of the magnetized area, the optical sensor of the optical head 4 detects it, and the detection signal is amplified by the amplifier circuit 9. Furthermore, the information signal reproducing circuit 10 reproduces an information signal by performing a predetermined signal process using the amplified detection signal, and outputs it from an output terminal T2.

Figure 2:
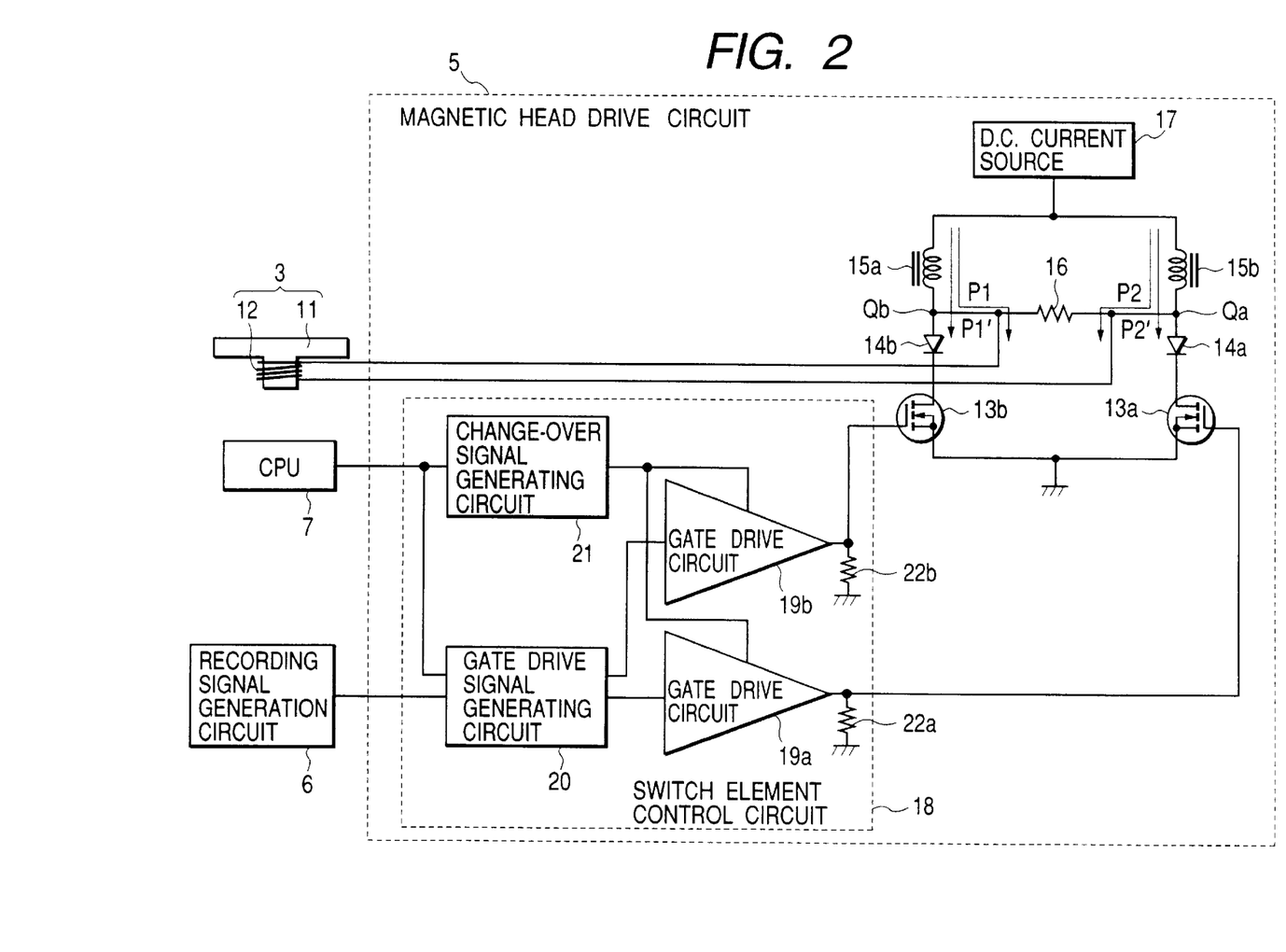
FIG. 2 shows an embodiment of a magnetic head drive circuit according to the present invention.

FIG. 2 shows the circuit showing the configuration of the magnetic head drive circuit 5. The magnetic head drive circuit 5 comprises switch elements 13a and 13b, diodes 14a and 14b, auxiliary coils 15a and 15b, a resistance element 16, a direct current source 17, and a switch element control circuit 18. The direct current source 17 is connected to the auxiliary coils 15a and 15b, the magnetic field generating coil 12 of the magnetic head 3 is connected between the connection point between the auxiliary coil 15a and the diode 14b and the connection point between the auxiliary coil 15b and the diode 14a. According to the present embodiment, the switch elements 13a and 13b are N channel MOS FETs (MOS type electric field effect transistors), but the MOS FET can be replaced with an element such as a bipolar transistor, etc. The auxiliary coils 15a and 15b are inductance elements having larger inductance than the magnetic field generating coil 12.

The switch element control circuit 18 comprises gate drive circuits 19a and 19b, a gate drive signal generating circuit 20, a change-over signal generating circuit 21, and resistance elements 22a and 22b. The outputs of the gate drive circuits 19a and 19b are respectively connected to the gates, that is, the control terminals of the switch elements 13a and 13b. The CPU 7 is connected to the change-over signal generating circuit 21, and the CPU 7 and the recording signal generating circuit 6 are connected to the gate drive signal generating circuit.

Figure 3:
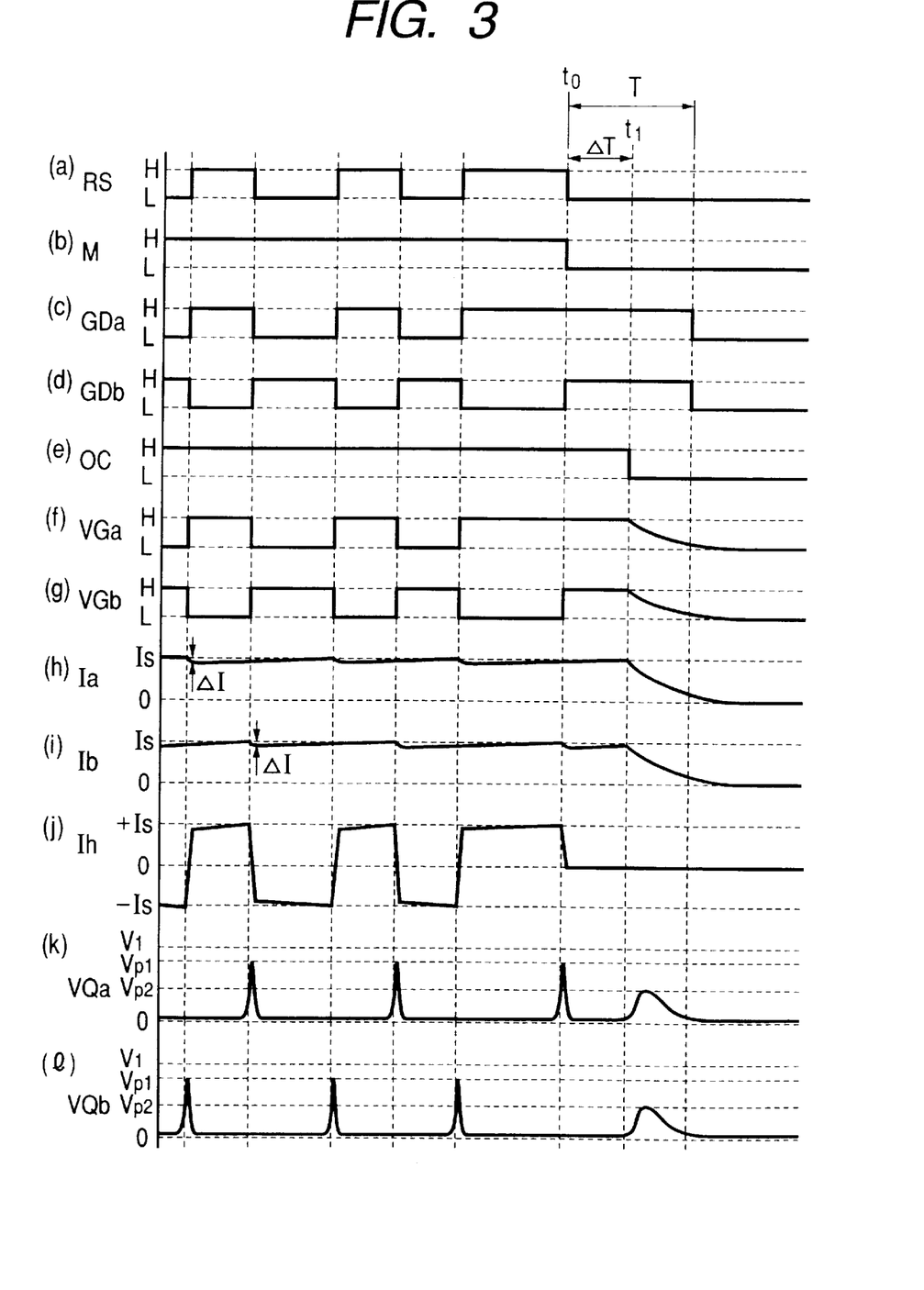
FIG. 3 shows waveforms of signals of respective units of the magnetic head drive circuit shown in FIG. 2.

Described below are the operations of the magnetic head drive circuit 5 performed during the recording of the information signal and when the information signal is stopped. FIG. 3 shows the signal waveform of each unit of the magnetic head drive circuit 5. The time point t0 denotes a time point at which the process of recording an information signal is stopped. During the process of recording the information signal (before the time point t0), the recording signal generating circuit 6 generates a recording signal RS as shown in (a) of FIG. 3 according to an information signal to be recorded, and outputs it to the gate drive signal generating circuit 20. The recording signal RS is a binary signal, that is, variable between the high level (H) and the low level (L). On the other hand, the CPU 7 generates an operation mode signal M as shown in (b) of FIG. 3, and outputs it to the gate drive signal generating circuit 20 and the change-over signal generating circuit 21. The operation mode signal M indicates the high level in the recording mode (during the process of recording an information signal), and is switched to the low level when the recording process stops at the time point t0 and enters the non-recording mode.

As shown in (c) and (d) of FIG. 3, the gate drive signal generating circuit 20 generates two gate drive signals GDa and GDb corresponding to the level of the input recording signal RS while the information signal is being recorded (before the time point t0), and outputs them to the gate drive circuits 19a and 19b, respectively. When the recording signal RS indicates the high level, the gate drive signal GDa indicates the high level, and the gate drive signal GDb indicates the low level. On the other hand, when the recording signal RS indicates the low level, the gate drive signal GDa indicates the low level, and the gate drive signal GDb indicates the high level. If the recording process stops at the time point t0 and the operation mode signal M is switched into the low level, then the gate drive signal generating circuit 20 maintains the output gate drive signals GDa and GDb at the high level, and then switches them into the low level after a predetermined period T. In this example, the switching timing into the low level of the gate drive signals GDa and GDb is generated in the gate drive signal generating circuit 20 based on the switch into the low level of the operation mode signal M at the time point t0. However, it can be determined according to an external timing signal.

The change-over signal generating circuit 21 generates an output impedance change-over signal OC as shown in (e) of FIG. 3, and outputs it to the output control terminal of the gate drive circuits 19a and 19b. The output impedance change-over signal OC indicates the high level during the process of recording an information signal (before the time point t0), maintains the high level for the period of ΔT after the recording process stops, and is switched into the low level at the time point t1. In this example, the timing of switching the output impedance change-over signal OC into the low level is generated in the change-over signal generating circuit 21 based on the switch of the operation mode signal M into the low level at the time point t0. However, it can be determined according to an external timing signal.

In addition, the time point at which the gate drive signals GDa and GDb are switched into the low level is assumed to come at or after the time point t1, that is, $0 \leq \Delta T \leq T$, at which the output impedance change-over signal OC is switched into the low level. It is desired to set the period T and ΔT to values enough to maintain the order in switching the signals even if there arises a small change in a timing of switching the signals due to the influence of noise, etc. For example, the period T is at least n times (n is an integer equal to or larger than 2) the period of the basic clock of the recording signal RS, and ΔT is m times (m is an integer equal to or larger than 1, and smaller than n) the period of the basic clock of the recording signal RS.

The gate drive circuits 19a and 19b are buffer circuits whose levels of the output impedance are switched according to the output impedance change-over signal OC input to the output control terminal. That is, when the output impedance change-over signal OC indicates the high level, the gate drive circuits 19a and 19b output the voltages VGa and VGb equivalent to the gate drive signals GDa and GDb input from the gate drive signal generating circuit 20. The output impedance RL has to be low enough, and to be equal to or lower than 1 kΩ preferably. When the output impedance change-over signal OC indicates the low level, the output of the gate drive circuits 19a and 19b does not depend on the gate drive signals GDa and GDb, but the output impedance RH is high enough, and to be equal to or higher than 100 kΩ preferably.

Thus, as a result of control of the output of the gate drive circuits 19a and 19b, the output impedance of the gate drive circuits 19a and 19b is maintained at the low level during the process of recording an information signal, and the output voltages VGa and VGb are substantially equal to the gate drive signals CDa and GDb as shown in (f) and (g) of FIG. 3, that is, they are alternately switched into the high level and the low level according to the recording signal RS. Additionally, during the period of ΔT from the time point t0 at which the recording process is stopped to the time point t1, the output impedance of the gate drive circuits 19a and 19b is maintained at the low level, but both output voltages VGa and VGb indicate the high level.

Furthermore, when the output impedance change-over signal OC is switched into the low level at the time point t1, the output impedance of the gate drive circuits 19a and 19b is switched into the high level. Then, the electric charge accumulated at the gates of the switch elements 13a and 13b is discharged through the resistance elements 22a and 22b, and the voltages VGa and VGb are gradually changed from the high level to the low level. Since the speed of dropping the voltages VGa and VGb is inversely proportional to C and R where the C indicates the input capacity of the gates of the switch elements 13a and 13b, and the R indicates the resistance values of the resistance elements 22a and 22b, the dropping speed of the voltages VGa and VGb can be lower enough than the changing speed between the high and low levels of the information signal being recorded.

The resistance elements 22a and 22b do not have disadvantageous influence such as lowering the output voltages VGa and VGb of the gate drive circuits 19a and 19b during the process of recording an information signal, but effectively function such that the voltages VGa and VGb can drop gradually when the information signal recording process is stopped. Therefore, it is desired that the resistance value R is set to a value larger than the value RL indicating the low output impedance of the gate drive circuits 19a and 19b, and smaller than the value RH indicating the high level.

Thus, the voltages VGa and VGb output by the gate drive circuits 19a and 19b are respectively applied to the gates of the switch elements 13a and 13b to control the ON/OFF state. That is, when the voltage VGa or VGb indicates the high level, the switch element 13a or 13b is ON. When the voltage VGa or VGb indicates the low level, the switch element 13a or 13b is OFF. As a result, during the process of recording an information signal, the switch elements 13a and 13b are alternately turned ON and OFF according to the recording signal RS.

When the switch element 13a is ON and the switch element 13b is OFF, a current is applied from the direct current source 17 to the magnetic field generating coil 12, the diode 14a, and the switch element 13a through the auxiliary coil 15a. The current path is P1. Simultaneously, a current is applied from the direct current source 17 to the diode 14a and the switch element 13a through the auxiliary coil 15b. The current path is P2'. When the switch element 13a is OFF and the switch element 13b is ON, a current is applied from the direct current source 17 to the magnetic field generating coil 12, the diode 14b, and the switch element 13b through the auxiliary coil 15b. The current path is P2. Simultaneously, a current is applied from the direct current source 17 to the diode 14b and the switch element 13b through the auxiliary coil 15a. The current path is P1'.

The current Ia of the auxiliary coil 15a and the current Ib of the auxiliary coil 15b are maintained at a substantially constant value Is during the process of recording an information signal as shown in (h) and (i) of FIG. 3. For example, the constant value Is is about 0.15A. However, when the switch element 13b is switched from ON to OFF and the current path is switched from P1' to P1, the current Ia of the auxiliary coil 15a is reduced by ΔI from the Is. When the switch element 13a is switched from ON to OFF and the current path is switched from P2' to P2, the current Ib of the auxiliary coil 15b is reduced by ΔI from the Is. ΔI is small enough than Is, and at most 10% or less than Is. The currents Ia and Ib gradually rise after a temporary drop, and return to the substantially constant value Is.

The current Ih applied to the magnetic field generating coil 12 during the process of recording an information signal is the current through the current path P1 when the recording signal RS indicates the high level as shown in (j) of FIG. 3, that is, the current Ia through the auxiliary coil 15a, and the current through the current path P2 when the recording signal RS indicates the low level, that is, the current Ib through the auxiliary coil 15b. Thus, the application direction of the current Ih applied to the magnetic field generating coil 12 is alternately switched according to the recording signal RS, and the amplitude is about ±Is. The resistance element 16 is provided to avoid the fluctuation of the current Ih of the magnetic field generating coil 12 after the switch of the direction. The diodes 14a and 14b are provided to avoid a back current through the switch elements 13a and 13b.

The inductance of the auxiliary coils 15a and 15b is larger than the magnetic field generating coil 12. Therefore, the voltage VQa of the connection point Qa between the auxiliary coil 15b and the diode 14a, and the voltage VQb of the connection point Qb between the auxiliary coil 15a and diode 14b change in the pulse-like form by the electromagnetic induction applied when the current Ib of the auxiliary coil 15b and the current Ia of the auxiliary coil 15a are reduced by about ΔI at the switch point of the recording signal RS as shown in (k) and (l) of FIG. 3. When the changing speed at the time when the current Ih of the magnetic field generating coil 12 is switched is set to 0.03 A/ns (double the above mentioned conventional technology) at maximum, the peak value Vp1 of the pulse-like voltage is about 30 V.

Since the voltage VGa applied to the gate of the switch element 13a and the voltage VGb applied to the gate of the switch element 13b indicate the high level in the period ΔT from the time point t0 at which the process of recording an information signal is stopped to the time point t1, both switch elements 13a and 13b are maintained in the ON state. In this period, a current is applied from the direct current source 17 to the diode 14b and the switch element 13b through the auxiliary coil 15a (current path P1'), and simultaneously a current is applied from the direct current source 17 to the diode 14a and the switch element 13a through the auxiliary coil 15b (current path P2'). As a result, during the period, as in the period when the information signal is recorded, the current Ia of the auxiliary coil 15a and the current Ib of the auxiliary coil 15b are maintained as the substantially constant value Is. However, at or after the time point t0, a current is not applied to the magnetic field generating coil 12 as shown in (j) of FIG. 3.

At or after the time point t1, the voltages VGa and VGb gradually drop from the high level to the low level as shown in (f) and (g) of FIG. 3, and the resistance between the drain and the source of the switch elements 13a and 13b is gradually switched from the sufficiently low state (ON state) to the sufficiently high state (OFF state). The switch from the ON to the OFF of the switch elements 13a and 13b is slower at least than the ON/OFF switch during the process of recording an information signal. For example, the time for ON/OFF switch during the process of recording an information signal is 10 ns while the time for switch from ON to OFF when the recording process is stopped is 300 ns. As a result, the current Ia of the auxiliary coil 15a and the current Ib of the auxiliary coil 15b are gradually reduced as in the process of switching the switch elements 13a and 13b. For example, the time taken from the value of Is of the currents Ia and Ib to the value of 0 after the complete OFF state of the switch elements 13a and 13b is 300 ns.

In addition, the voltage VQa at the connection point Qa and voltage VQb at the connection point Qb temporarily rise due to the electromagnetic induction accompanied with the reduction of the current Ib of the auxiliary coil 15b and the current Ia of the auxiliary coil 15a as shown in (k) and (l) of FIG. 3 at and after the time point t1, and are reduced after the peak value Vp2 is reached. At this time, assuming that the inductance of the auxiliary coils 15b and 15a is L, and the current changing speed is dIx/dt (where Ix indicates the current Ia of the auxiliary coil 15a or the current Ib of the auxiliary coil 15b), the voltages VQa and VQb generally match −L·dIx/dt. By slowly switching the switch elements 13a and 13b from ON to OFF, the value |dIx/dt| indicating the reducing speed of the current Ia of the auxiliary coil 15a and the current Ib of the auxiliary coil 15b can be reduced. Therefore, the peak value Vp2 of the voltage generated by the electromagnetic induction can be reduced.

Assuming that the changing speed of the current Ih applied to the magnetic field generating coil 12 during the process of recording an information signal is dIh/dt, the peak value Vp2 of the voltages VQa and VQb can be reduced much more than the conventional technology if the maximum value (absolute value) |dIx/dt|max of the changing speed of the current Ia of the auxiliary coil 15a and the current Ib of the auxiliary coil 15b at or after the time point t1 can be at least smaller than the maximum value (absolute value) |dIh/dt|max of the changing speed when the direction of the current Ih applied to the magnetic field generating coil 12 is switched. It is more recommendable to make it smaller than |dIh/dt|max×0.5. Furthermore, if the inductance of the magnetic field generating coil 12 is set to k·L (where 0<k<1), it is the most recommendable for |dIx/dt|max and |dIh/dt|max to satisfy the following equation (1).

$$|dIx/dt|max \leq k|dIh/dt|max \quad (1)$$

For example, assuming that the inductance L of the auxiliary coils 15a and 15b is 50 μH, the inductance k·L of the magnetic field generating coil 12 is 1 μH (k=0.02), and the maximum value |dIh/dt|max of the changing speed when the current Ih of the magnetic field generating coil 12 is switched is 0.03 A/ns, the maximum value |dIx/dt|max of the changing speed of the current Ia of the auxiliary coil 15a and the current Ib of the auxiliary coil 15b can be 6×10⁻⁴ A/ns. For example, assuming that |dIx/dt|max is 5×10⁻⁴ A/ns, the peak value Vp1 during the process of recording an information signal of the voltages VQa and VQb is 30 V, and the peak value Vp2 after the recording process is stopped (at the time point t0) is about 25 V.

Thus, when the relationship expressed by the above mentioned equation (1) exists, Vp2 s Vp1. Therefore, if only the peak value Vp1 of the voltages VQa and VQb during the process of recording an information signal is taken into account, and the switch elements 13a and 13b whose resistible voltage Vt is higher than Vp1, then the switch element is not destroyed by applying the voltage exceeding the resistible voltage Vt to the switch elements 13a and 13b even during the process of recording an information signal or when the process is stopped. For example, in the above mentioned embodiment, a MOS FET whose withstand voltage between a drain and a source is 40 V, and a bipolar transistor having the resistible voltage of 40 V between a collector and emitter can be used as the switch elements 13a and 13b.

As described above, according to the present embodiment, a switch element having a considerable lower withstand voltage Vt than the above mentioned conventional technology can be successfully available. In addition, although a current of a magnetic field generating coil is switched more quickly than the conventional technology, a practical switch element (for example, a MOS FET having a withstand voltage Vt equal to or lower than 1,000 V) can be used.

In the above mentioned embodiment, the switch elements 13a and 13b are first set in ON state when the information signal recording process is stopped, and then they are switched from the ON state to the OFF state slower than in the process of recording the signal. Furthermore, the object of the present invention can also be attained and the current Ia of the auxiliary coil 15a and the current Ib of the auxiliary coil 15b can be gradually lowered by maintaining at least one of the switch elements 13a and 13b in the ON state, and then switching them from the ON state to the OFF state slower than in the recording process.

For example, assume that only the switch element 13a is maintained in the ON state and the switch element 13b is set in the OFF state in the period from the time point t0 at which the information signal recording process is stopped to the time point t1. During the period, a current is applied to the magnetic field generating coil 12, the diode 14a, and the switch element 13a from the direct current source 17 through the auxiliary coil 15a (current path P1), and simultaneously a current is applied to the diode 14a, and the switch element 13a from the direct current source 17 through the auxiliary coil 15b (current path P2'). As a result, the current Ia of the auxiliary coil 15a and the current Ib of the auxiliary coil 15b are maintained at the substantially constant value Is. Then, at and after the time point t1, the switch element 13a is gradually switched from the ON state to the OFF state. In this connection, the current Ia of the auxiliary coil 15a and the current Ib of the auxiliary coil 15b are gradually reduced.

According to the present embodiment, the switch elements 13a and 13b are MOS FET, but when bipolar transistors are used, the switch element control circuit 18 controls the ON/OFF state by applying a current to the bases of the switch elements 13a and 13b. Similarly, in this case, the ON/OFF state of the switch elements 13a and 13b is controlled during the information signal recording process by switching the current applied to the base according to the information signal to be recorded. When the information signal recording process is stopped, at least one of the switch elements 13a and 13b is set in the ON state by applying a current to both bases or one base of the switch elements 13a and 13b, and then the switch elements 13a and 13b are gradually switched from the ON state to the OFF state by gradually lowering the current applied to the base.

When a series of information signals arc recorded, the present invention can be applied not only when the information signal recording process is completely performed, but also each time the process is temporarily suspended when the information signal recording process is performed in a time-division manner. One example is when an information signal is divided for recording in a plurality of recording sectors provided in the magneto-optical recording medium.

As described above, according to the present invention, since a switch element is slowly switched from ON to OFF when the information signal recording process is stopped, the speed of lowering the current through an auxiliary coil is reduced, and the peak value Vp2 of the voltage generated by the auxiliary coil through the electromagnetic induction can be reduced. As a result, a MOS FET having a lower withstand voltage between a drain and a source than the conventional technology can be used as a switch element. Simultaneously, an ON resistance (resistance between a drain and a source in the ON state) is also reduced, and the consumption of electric power is reduced.

Furthermore, even when a current through a magnetic field generating coil is quickly switched, a practical withstand voltage Vt can use a MOS FET of 1,000 V or lower. Therefore, by raising the highest frequency of an information signal to be recorded, the recording speed can be improved. Furthermore, a bipolar transistor having a lower withstand voltage between a collector and an emitter than the conventional technology can be used as a switch element with an increasing gain band width product $f_T$, thereby improving the recording speed by raising the highest frequency of an information signal to be recorded.

What is claimed is:

1. A magnetic head drive circuit which applies a current for recording an information signal to a magnetic field generating coil of a magnetic head, comprising:

a pair of auxiliary coils;

a pair of switch elements connected in series to said pair of auxiliary coils; and a switch element control circuit for controlling said switch elements, wherein said magnetic field generating coil is provided between connection points of said pair of auxiliary coils and said pair of switch elements, said switch element control circuit switches a direction of a drive current flowing through said magnetic field generating coil by alternately setting ON said pair of switch elements according to an information signal during recording of an information signal, and maintains said switch element in an ON state when the recording of the information signal is stopped, and then switches said switch element from the ON state to an OFF state slower than in said recording of the information signal.

2. The magnetic head drive circuit according to claim 1, wherein when said recording of the information signal is stopped, said switch element is switched with satisfying a following expression:

$|dIx/dt|max < |dIh/dt|max$, where a left side indicates a maximum value (absolute value) of a speed of reducing a current Ix of said auxiliary coil when the process of recording an information signal is stopped, and a right side indicates a maximum value (absolute value) of a changing speed when a current Ih of said magnetic field generating coil is switched during the process of recording an information signal.

3. The magnetic head drive circuit according to claim 1, wherein when said process of recording the information signal is stopped, said switch element is switched with a following expression satisfied $|dIx/dt|max < |dIh/dt|max \times 0.5$ where a left side indicates a maximum value (absolute value) of a speed of reduction of a current Ix of said auxiliary coil when the recording of the information signal is stopped, and a right side indicates a maximum value (absolute value) of a changing speed of the current Ih of said magnetic field generating coil when the current is switched during the recording of the information signal.

4. The magnetic head drive circuit according to claim 2 or 3, wherein when an inductance of said auxiliary coil is L, an inductance of said magnetic field generating coil is k·L (0<k<1), and when said recording of the information signal is stopped, said switch element is switched with satisfying a following expression:

$|dIx/dt|max < k|dIh/dt|max$, where a left side indicates a maximum value (absolute value) of a speed of reduction of a current Ix of said auxiliary coil when the recording of the information signal is stopped, and a right side indicates a maximum value (absolute value) of a changing speed of the current Ih of said magnetic field generating coil when the current is switched during the recording of the information signal.

5. The magnetic head drive circuit according to claim 1, wherein said switch element is a MOS FET, said switch element control circuit is configured to switch an ON/OFF state of said switch element by applying an output voltage thereof to a gate of said switch element, switches the ON/OFF state of said switch element by switching the output voltage depending on a signal to be recorded during the recording of the information signal, and switches said switch element from the ON state to the OFF state slower than in the recording of the information signal by more slowly switching the output voltage when the recording of the information signal is stopped.

6. The magnetic head drive circuit according to claim 5, wherein said switch element control circuit is constituted by a gate drive circuit capable of outputting a voltage to be applied to the gate of said switch element, and switching high and low output impedance, and said gate drive circuit switches and controls an ON/OFF state of said switch element by holding low output impedance, switching an output voltage according to an information signal to be recorded and applying the voltage to the gate of said switch element in the recording of the information signal, and controls said switch element to set in the ON state by applying the output voltage to the gate of said switch element while holding the low output impedance, and then switches said switch element from the ON state to the OFF state slower than in the recording of the information signal by switching the output impedance into a high level when the recording of the information signal is stopped.

7. The magnetic head drive circuit according to claim 6, wherein said switch element control circuit further comprises a resistive element for discharging an electric charge accumulated in said switch element, and a resistance value R of said resistive element is set at a value larger than RL and smaller than RH, where RL and RH indicate values of low and high states of the output impedance of said gate drive circuit, respectively.

8. A magneto-optical recording device, comprising:

a magnetic head drive circuit according to any of claims 1 to 3 and 5 to 7, and an optical head, wherein a magnetic field generated according to an information signal to be recorded is applied from said magnetic field generating coil to a magneto-optical recording medium, and an optical beam is emitted by said optical head to a portion to which said magnetic field is applied, thereby recording the information signal on the magneto-optical recording medium.

9. A magneto-optical recording device, comprising a magnetic head drive circuit according to claim 4, and an optical head, wherein a magnetic field generated according to an information signal to be recorded is applied from said magnetic field generating coil to a magneto-optical recording medium, and an optical beam is emitted by said optical head to a portion to which said magnetic field is applied, thereby recording the information signal on the magneto-optical recording medium.

* * * * *

UNITED STATES PATENT AND TRADEMARK OFFICE
CERTIFICATE OF CORRECTION

PATENT NO. : 6,477,119 B2
DATED : November 5, 2002
INVENTOR(S) : Kazuyoshi Ishii It is certified that error appears in the above-identified patent and that said Letters Patent is hereby corrected as shown below:

<u>Column 4,</u>
Line 34, "magne3tic" should read -- magnetic --.

<u>Column 5,</u>
Line 49, "point to" should read -- point t0 --.

<u>Column 6,</u>
Line 26, "AT" should read -- $\Delta$T --.

<u>Column 7,</u>
Line 21, "lower" should read -- sufficiently lower --; and
Line 22, "enough" should be deleted.

<u>Column 8,</u>
Line 3, "small" should read -- sufficiently smaller --; and
Line 4, "enough" should be deleted.

Signed and Sealed this

Twelfth Day of August, 2003

JAMES E. ROGAN
*Director of the United States Patent and Trademark Office*